US008204560B2

(12) United States Patent
Alameh et al.

(10) Patent No.: US 8,204,560 B2
(45) Date of Patent: Jun. 19, 2012

(54) CLAMSHELL PHONE WITH EDGE ACCESS

(75) Inventors: Rachid Alameh, Crystal Lake, IL (US); Julio Castaneda, Coral Springs, FL (US); Paul Pierce, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 585 days.

(21) Appl. No.: 12/337,054

(22) Filed: Dec. 17, 2008

(65) Prior Publication Data

US 2010/0151923 A1   Jun. 17, 2010

(51) Int. Cl.
*H04M 1/00*   (2006.01)
(52) U.S. Cl. ............................ 455/575.3; 455/575.1
(58) Field of Classification Search ............ 455/575.3, 455/575.1, 575.4
See application file for complete search history.

(56) References Cited

U.S. PATENT DOCUMENTS

| | | |
|---|---|---|
| 5,649,309 A | 7/1997 | Wilcox et al. |
| 6,047,196 A | 4/2000 | Makela et al. |
| D448,032 S | 9/2001 | Talley |
| 6,295,358 B1 | 9/2001 | Kubota |
| 6,616,233 B1 | 9/2003 | Debus et al. |
| 6,708,046 B1 | 3/2004 | Takagi |
| 6,731,912 B1 | 5/2004 | Miyashita |
| 6,780,053 B1 | 8/2004 | Yunker et al. |
| 6,785,127 B1 | 8/2004 | Monney et al. |
| 6,862,459 B2 | 3/2005 | Sawada et al. |
| 6,954,653 B2 | 10/2005 | Morita et al. |
| 6,990,711 B2 | 1/2006 | Koshikawa et al. |
| 6,996,426 B2 | 2/2006 | Granberg |
| 7,003,333 B2 | 2/2006 | Chow et al. |
| 7,010,333 B2 | 3/2006 | Trively |
| 7,028,373 B2 | 4/2006 | Harmon et al. |

(Continued)

FOREIGN PATENT DOCUMENTS

EP   1617630 A1   1/2006

(Continued)

OTHER PUBLICATIONS

United States Patent and Trademark Office "Notice of Allowance and Fees Due" for U.S. Appl. No. 11/771,452 May 3, 2011, 17 pages.

(Continued)

*Primary Examiner* — Peguy Jean Pierre

(57) ABSTRACT

A handheld communication device (10) is provided. The handheld communication device (10) includes a first housing (102) having a circuit board portion (230) and a display portion (240) extending from a first end of the circuit board portion along a (230) predominant plane (239) of the first housing (102), a second housing (104) including a battery (342) and a keypad (124) where the battery (342) and keypad (124) are coextensive along a length and width of a predominant plane (227) of the second housing (104), a hinge assembly (106) that couples a midpoint of the circuit board portion (230) to an end (226) of the second housing (104) where the hinge assembly (106) defines a pivot axis that is mutually parallel to the predominant planes of the both the first and second housings (102, 104) and a user connector (130) located on a second end (128) of the circuit board portion (230) opposite the display portion (240) where an axis of insertion of the user connector is parallel to the predominant plane of the first housing (102) and wherein a total thickness of the display portion (240) and second housing (104) is substantially equal to a thickness of the circuit board portion (230).

20 Claims, 8 Drawing Sheets

U.S. PATENT DOCUMENTS

| | | | |
|---|---|---|---|
| 7,107,077 | B2 | 9/2006 | Lee |
| 7,181,253 | B2 | 2/2007 | Kim |
| 7,286,860 | B2 | 10/2007 | Harris |
| 7,383,066 | B2 | 6/2008 | Park |
| 7,409,225 | B2 | 8/2008 | Kim et al. |
| 7,433,179 | B2 | 10/2008 | Hisano et al. |
| 7,499,074 | B2 | 3/2009 | Kim et al. |
| 7,529,521 | B2 | 5/2009 | Yunker et al. |
| 7,561,686 | B2 | 7/2009 | Vance |
| 7,708,228 | B2 | 5/2010 | Chaix et al. |
| 7,756,552 | B2 | 7/2010 | Haikola et al. |
| 7,756,554 | B2 | 7/2010 | Jung |
| 2002/0018556 | A1* | 2/2002 | Okazaki et al. .......... 379/373.02 |
| 2002/0022503 | A1 | 2/2002 | Lee |
| 2002/0094826 | A1 | 7/2002 | Lee |
| 2003/0096582 | A1 | 5/2003 | Kim |
| 2004/0058720 | A1 | 3/2004 | Kubo et al. |
| 2004/0204129 | A1 | 10/2004 | Payne et al. |
| 2004/0204200 | A1 | 10/2004 | Park |
| 2004/0261223 | A1 | 12/2004 | Wang et al. |
| 2004/0264118 | A1 | 12/2004 | Karidis et al. |
| 2005/0091431 | A1 | 4/2005 | Olodort et al. |
| 2005/0125570 | A1 | 6/2005 | Olodort et al. |
| 2005/0208903 | A1 | 9/2005 | Sakamoto |
| 2006/0030375 | A1 | 2/2006 | Tanaka |
| 2006/0034042 | A1 | 2/2006 | Hisano et al. |
| 2006/0063570 | A1 | 3/2006 | Nishimura |
| 2006/0183505 | A1 | 8/2006 | Willrich |
| 2007/0129121 | A1 | 6/2007 | Chambers et al. |
| 2007/0142101 | A1 | 6/2007 | Seshagiri et al. |
| 2007/0184786 | A1 | 8/2007 | Kim |
| 2007/0192990 | A1 | 8/2007 | Christensen |
| 2007/0197268 | A1 | 8/2007 | Terada et al. |
| 2007/0197271 | A1 | 8/2007 | Haikola et al. |
| 2007/0254729 | A1 | 11/2007 | Freund |
| 2007/0265028 | A1 | 11/2007 | Jorgensen et al. |
| 2008/0125195 | A1 | 5/2008 | Maenpaa |
| 2008/0125196 | A1 | 5/2008 | Ryu |
| 2008/0214252 | A1 | 9/2008 | Oten et al. |
| 2008/0300030 | A1 | 12/2008 | Wang |
| 2008/0307658 | A1 | 12/2008 | Jun |
| 2009/0005131 | A1* | 1/2009 | Gitzinger et al. .......... 455/575.3 |
| 2009/0011802 | A1* | 1/2009 | Malthe et al. ............. 455/575.1 |
| 2009/0017875 | A1 | 1/2009 | Boesen |
| 2009/0137274 | A1 | 5/2009 | Kim et al. |
| 2009/0170571 | A1 | 7/2009 | Alameh et al. |
| 2009/0176473 | A1 | 7/2009 | Fellner |
| 2009/0253472 | A1 | 10/2009 | Kim |
| 2010/0188807 | A1 | 7/2010 | Alameh et al. |
| 2010/0210326 | A1 | 8/2010 | Ladouceur et al. |

FOREIGN PATENT DOCUMENTS

| | | |
|---|---|---|
| EP | 1439685 B1 | 12/2006 |
| KR | 20010087236 A | 9/2001 |
| KR | 20030032223 A | 4/2003 |
| KR | 20030083751 A | 10/2003 |
| KR | 1020060010333 A | 2/2006 |
| WO | 9819434 A1 | 5/1998 |
| WO | 2006007222 A1 | 1/2006 |
| WO | 2008142426 A2 | 11/2008 |

OTHER PUBLICATIONS

Patent Cooperation Treaty, "PCT Search Report and Written Opinion of the International Searching Authority" for International Application No. PCT/US2008/086756 Jun. 17, 2009, 10 pages.

United States Patent and Trademark Office "Non-Final Rejection" for U.S. Appl. No. 12/183,205 Feb. 4, 2011, 24 pages.

Patent Cooperation Treaty, "PCT Search Report and Written Opinion of the International Searching Authority" for International Application No. PCT/US2010/022025 Mar. 26, 2010, 11 pages.

United States Patent and Trademark Office, "Notice of Allowance and Fee(s) Due" for U.S. Appl. No. 12/361,682 Oct. 14, 2010, 31 pages.

Samsung's Digital World—Sprint, "SPH-N200" www.samsung.com/Products/MobilePhones/Sprint/SPH_N200SSXAR.asp, downloaded Jun. 29, 2007, 1 page.

United States Patent and Trademark Office, "Non-Final Office Action" U.S. Appl. No. 11/771,452 Jul. 9, 2010, 15 pages.

U.S. Appl. No. 60/668,334, filed Apr. 5, 2005, 26 pages.

* cited by examiner

US 8,204,560 B2

CLAMSHELL PHONE WITH EDGE ACCESS

FIELD OF THE INVENTION

The field of the invention relates to communication devices and, more particularly, to cellular telephones.

BACKGROUND

Some type of portable communication device, such as a cellular telephone or Blackberry type device, are carried by most people. In order to take advantage of the lowest rates, some people even carry more than one device (e.g., a cell phone and a Blackberry).

There is a trend toward increasing the functionality of such handheld electronic devices. In the case of cellular telephones, increased functionality may include adding chat or e-mail capabilities or providing the ability to take and playback photographs and/or video clips. Adding more functionality often leads to increased components and/or circuit elements which often corresponds to increased space requirements, which is at odds with the desire to make devices smaller.

In order to improve the comfort of carrying wireless devices, it is often useful to adjust the dimensions of such devices. One of the dimensions for which there is some desire to further reduce size includes depth. Historically, a reduction in depth has been at least partially achieved by minimizing the depth of each of the individual components contained in a particular component stack up. While this is a valid approach for reducing the overall depth, at any given time, there may be limits as to how far the depth of a particular component may be reduced.

It may be desirable to adjust dimensioning of a handheld electronic device in a particular direction by rearranging one or more of the components and/or repositioning a hinge assembly and corresponding hinge axis. Rearranging one or more of the components and/or repositioning a hinge assembly and corresponding hinge axis may allow some of the components to be shifted relative to other components, with the potential overall effect of achieving an aggregate dimension in one or more directions, such as depth, which meets the desired results. The repositioned hinge assembly may also facilitate one-handed opening of a thin clamshell-type device.

SUMMARY

A handheld communication device is provided. The handheld communication device includes a first housing having a circuit board portion and a display portion extending from a first end of the circuit board portion along a predominant plane of the first housing, a second housing including a battery and a keypad where the battery and keypad are coextensive along a length and width of a predominant plane of the second housing, a hinge assembly that couples around a midpoint of the circuit board portion to an end of the second housing where the hinge assembly defines a pivot axis that is mutually parallel to the predominant planes of the both the first and second housings and a user connector located on a second end of the circuit board portion opposite the display portion where an axis of insertion of the user connector is parallel to the predominant plane of the first housing, is accessible/exposed in the flip open or closed configuration and wherein a total thickness of the display portion and second housing is substantially equal to a thickness of the circuit board portion.

BRIEF DESCRIPTION OF THE DRAWINGS

In order to describe the manner in which the above-recited and other features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used.

Figure 1:
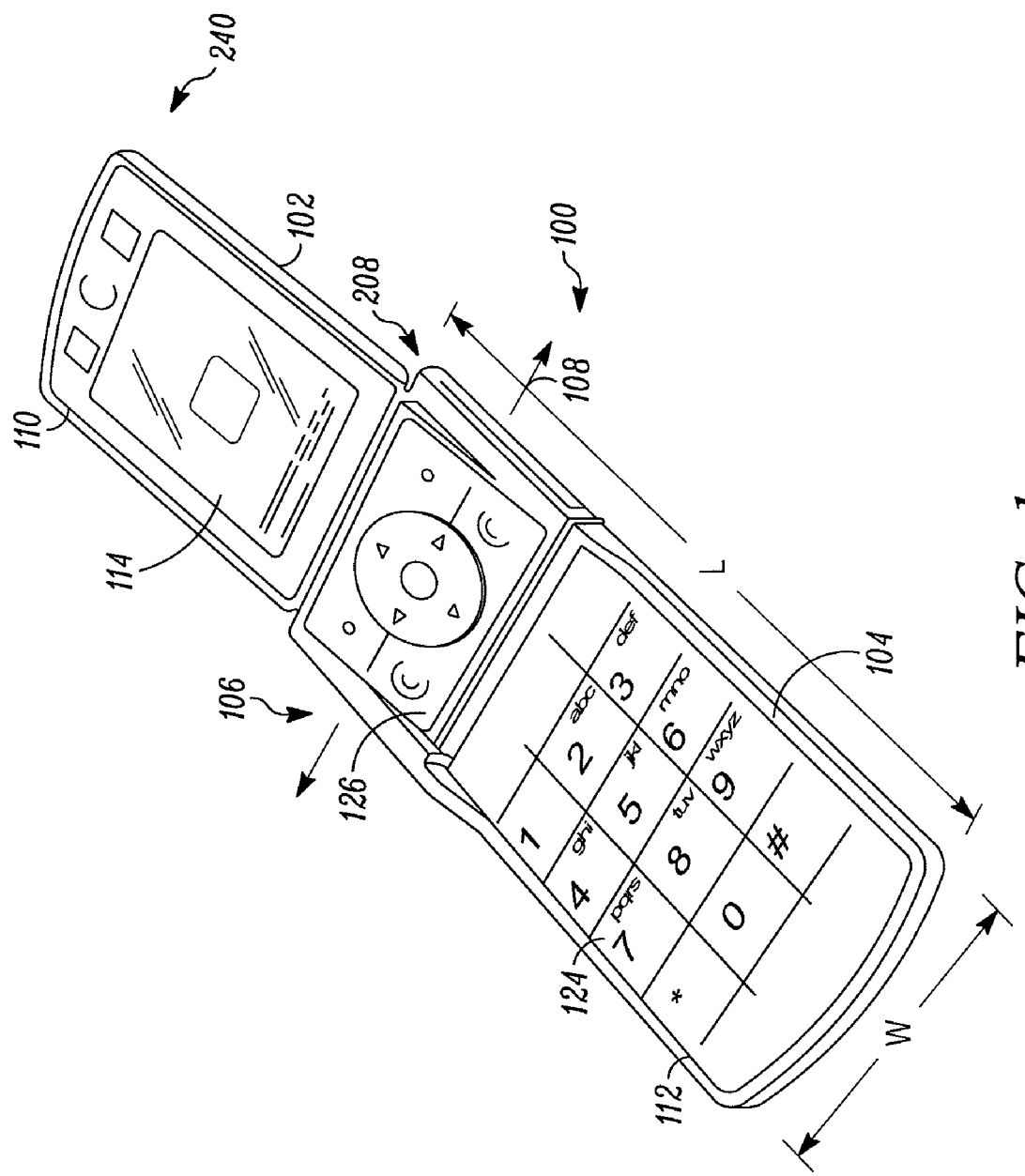
FIG. 1 is a perspective view of a handheld communication device in a first configuration, for example an opened position, in accordance with illustrated embodiments of the invention.
Figure 2A:
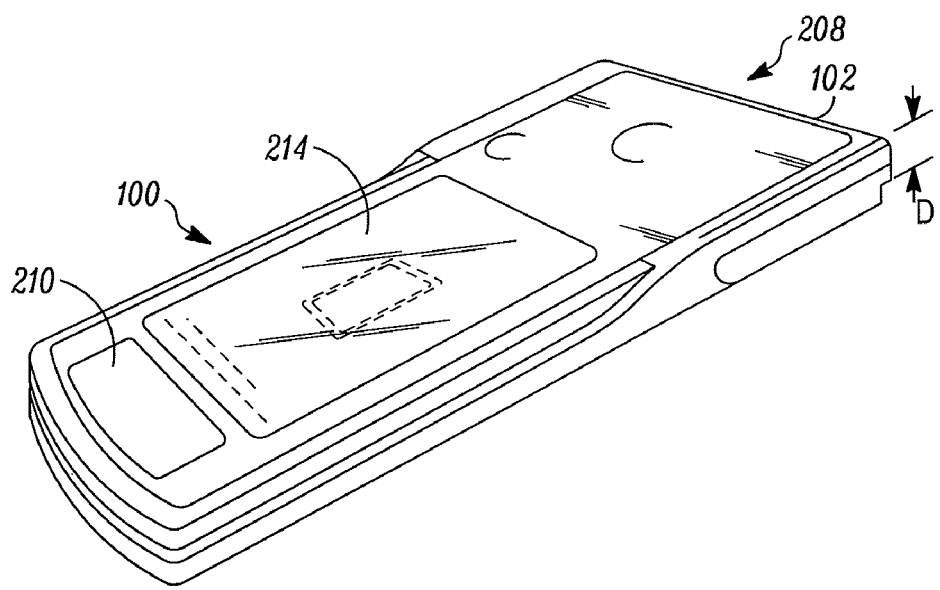
FIG. 2A is a front perspective view of the handheld communication device of FIG. 1, shown in a second configuration, for example a closed position.
Figure 2B:
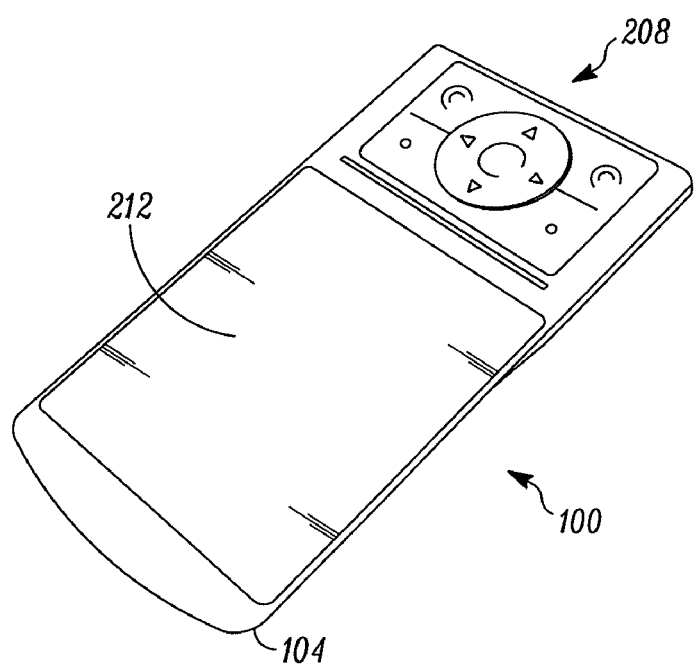
FIG. 2B is a rear perspective view of the handheld communication device of FIG. 1, shown in the second configuration.

FIG. 1 is a front perspective view of an exemplary handheld clamshell communication device having at least a two-part housing shown in an open configuration in accordance with an illustrated embodiment of the invention. FIG. 2A is a front perspective view of the handheld communication device 100, shown in a closed configuration, and FIG. 2B is a rear perspective view of the handheld communication device 100 in the closed configuration.

The device 100 may include an upper housing 102, which may be referred to as a flip portion, and a lower housing 104, which may be referred to as a base. The flip portion 102 and the base 104 may be coupled by a rotational coupling such as, for example, a hinge assembly 106. The hinge assembly on each side may include a pin 116 and circular aperture 118 in which the pin 116 rotates. The pin 116 may be attached to either the flip portion 102 or base portion 104 and drives a cam mechanism nested in the base portion (in one of the arms) to provide open and close assistance via an embedded cam spring.

The device 100 is relatively flat, which is to say that its depth D dimension is smaller than its width W and length L dimensions. The width W and length L of the flip portion 102 and base portion 104 define a predominant axis of each housing 102, 104. The length L and width W together define a predominant plane of the device 100. Relative to the illustrated embodiment, a reduced depth D may be an overall design goal.

The hinge assembly 106 defines a pivot axis that is parallel to the predominant planes 227, 239 of the base portion 104 and flip portion 102. The hinge assembly 106 allows the flip portion 102 to be rotated from the first, open configuration in which the flip portion 102 extends upward away from the lower part 104, to the second configuration in which the predominant planes of the base portion 104 and flip portions 102 are parallel and where the flip portion 102 overlies and is juxtaposed over the base portion 104 in the closed position. As will be discussed in more detail below, the hinge assembly 106 may have an axis 108 offset from a first end 208 of the device 100, when the device 100 is in the closed position.

According to various aspects, a main display 114 of the device 100 may be located on an inside surface 110 of the flip portion 102 (FIG. 1), and an auxiliary display 214 may be located on the first outside surface 210 of the flip portion 102 (FIG. 2A). The main display 114 and the auxiliary display 214 may be useful for displaying control screens including menus and information related to calls including lists of received calls, lists of placed calls, telephone numbers in a phone book, email addresses and web addresses, as well as a list of selectable functions, among other things.

In various aspects, the flip portion 102 may include one or more buttons on side edges of the flip portion 102 and/or the base 104. The button(s) may be used to generate signals for controlling various aspects of the operation of the device 100. For example, in one or more modes of operation of the device 100, a pair of buttons may be used as directional inputs, such as "UP" and "DOWN" commands, to control software of the device 100.

A first keypad 124 may be located on the inside surface 112 of the base 104. The first keypad 124 may include a cover (not shown) made of a sheet of flexible material. The flip portion 102 may include a second keypad 126 on the inside surface 110 thereof. In the open configuration, as shown in FIG. 1, the second keypad 126 is between and viewable with the first keypad 124 and the main display 114. The first and second keypads 124, 126 may appear seamless to a user when the device is in the open configuration. In the closed configuration, as shown in FIG. 2B, the second keypad 126 is adjacent and viewable with the outside surface 212 of the base 104. Thus, in the closed configuration, the second keypad 126 faces a direction opposite to the viewable direction of the auxiliary display 214. It should be appreciated that the second keypad 126 is functionally operable when the device is in the open position and when in the closed position.

Figure 3:
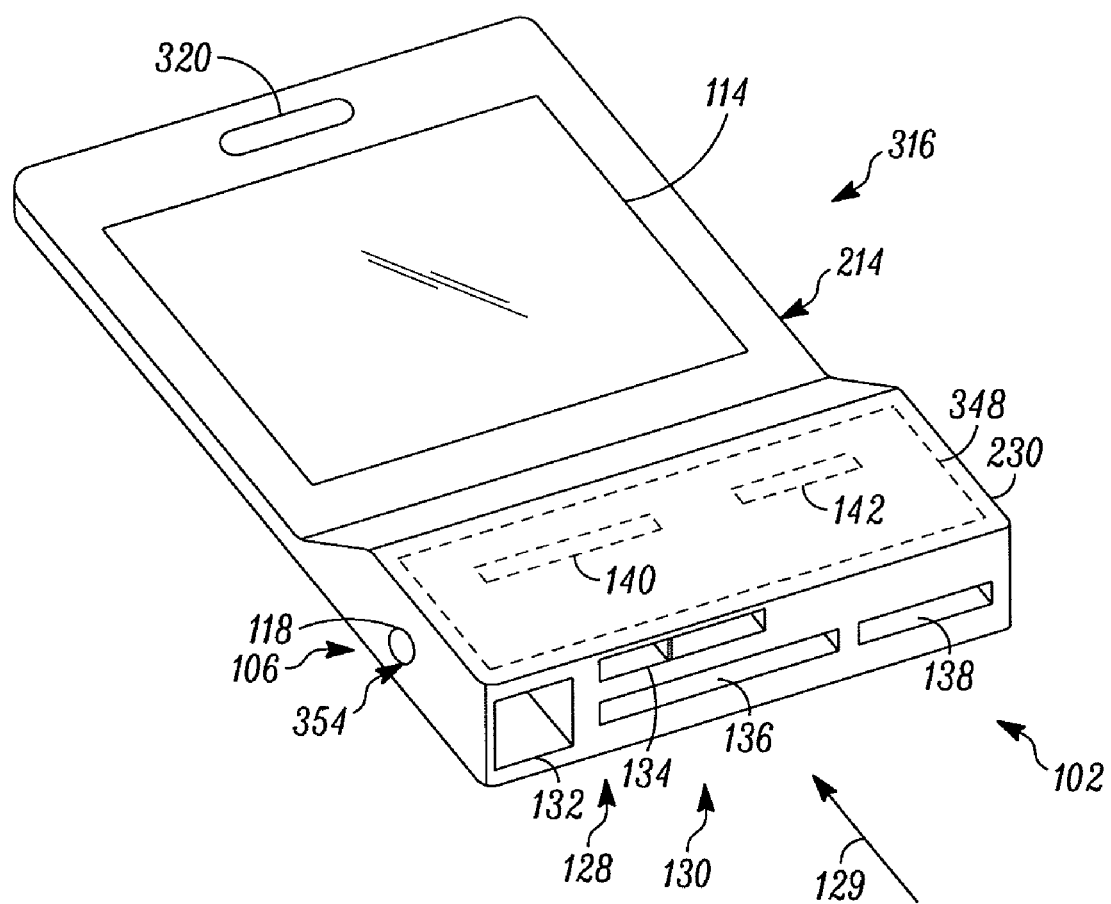
FIG. 3 is a perspective view of an upper housing of the handheld communication device shown in FIGS. 1, 2A, and 2B.

Referring now to FIG. 3 a number of components may be located in the flip portion 102. These components may include a display module 316, which includes the main display 114 and the auxiliary display 214, an earpiece speaker 320, and a main or circuit board portion 230 that includes one or more circuit boards 348. The populated printed circuit board 348 may include communication and control circuits of the device 100.

It should also be noted that a proximate end or edge 128 of the flip portion 102 adjacent to and parallel with the hinge 106 is provided with a user connector interface 130 accessible through the end 128 of the device 100. Included within the connector interface 130 may be a universal serial bus (USB) connector 132, a connector 140 for a subscriber identity module (SIM) card 136 and a connector 142 for a secure digital (SD) memory card.

Also included on the edge 128 may be a lock pushbutton 134. The lock pushbutton 134 may function to lock the flip touch keys located in the plane of the external display (below the external display) of the device 100 against unintentional activation. The lock pushbutton 134 may be either a slide pushbutton or an electronic pushbutton that causes contact closure under any of a number of different pushbutton technologies (e.g., capacitive, inductive, etc.).

Figure 4:
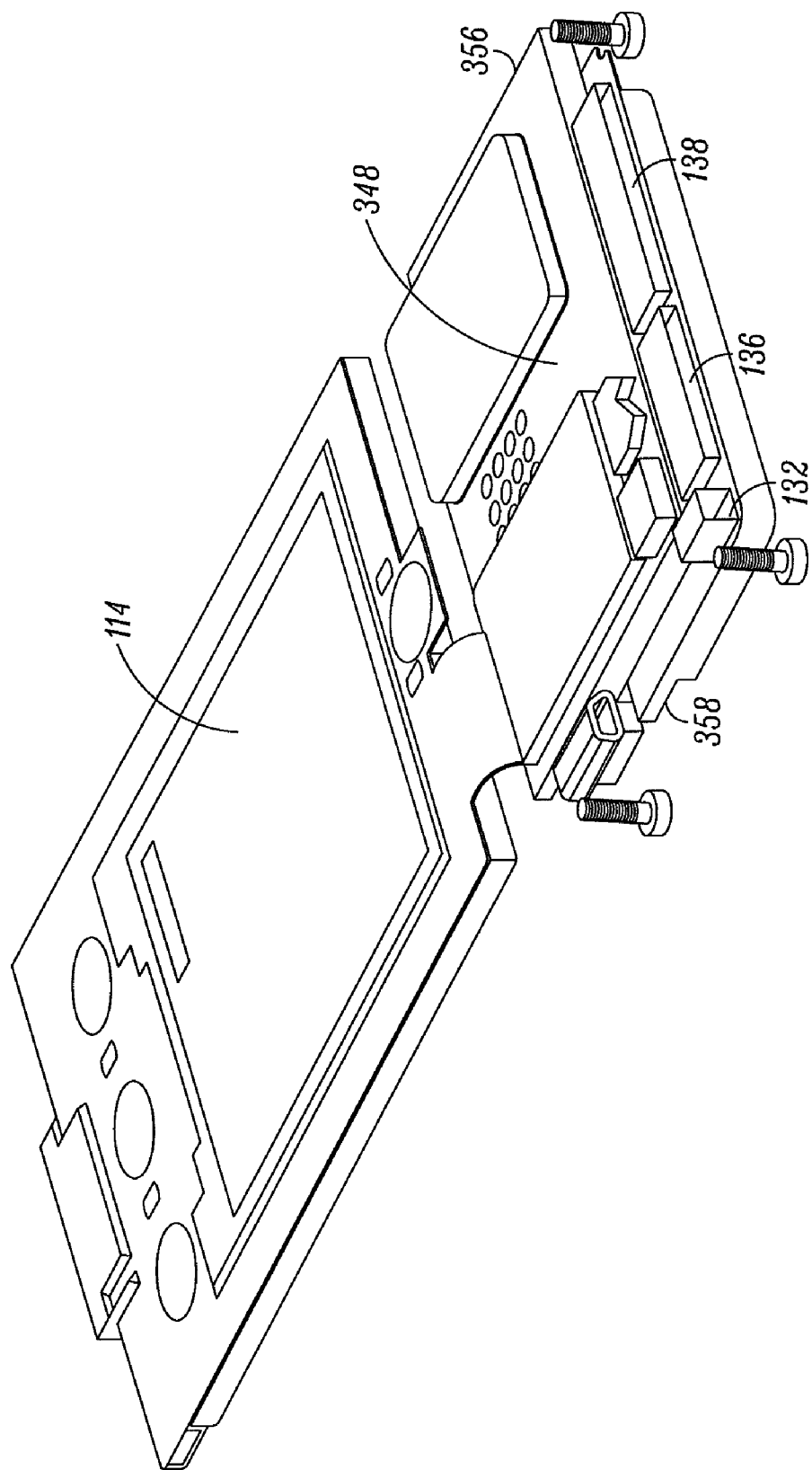
FIG. 4 is display and circuit boards of FIG. 3 with the housing removed.

FIG. 4 depicts the printed circuit board 348 and display 114 of FIG. 3. As shown, the printed circuit board 348 may actually include an upper circuit board 356 and a lower circuit board 358 with the USB connector 132, SIM card 136 and SD card 138 disposed between the upper and lower circuit boards 356, 358 (or along that edge in the case of only a single PCT) to further conserve space. As shown in FIGS. 3 and 4, an axis of insertion 129 into the user interface 130 is perpendicular to a pivot axis 108.

Figure 5:
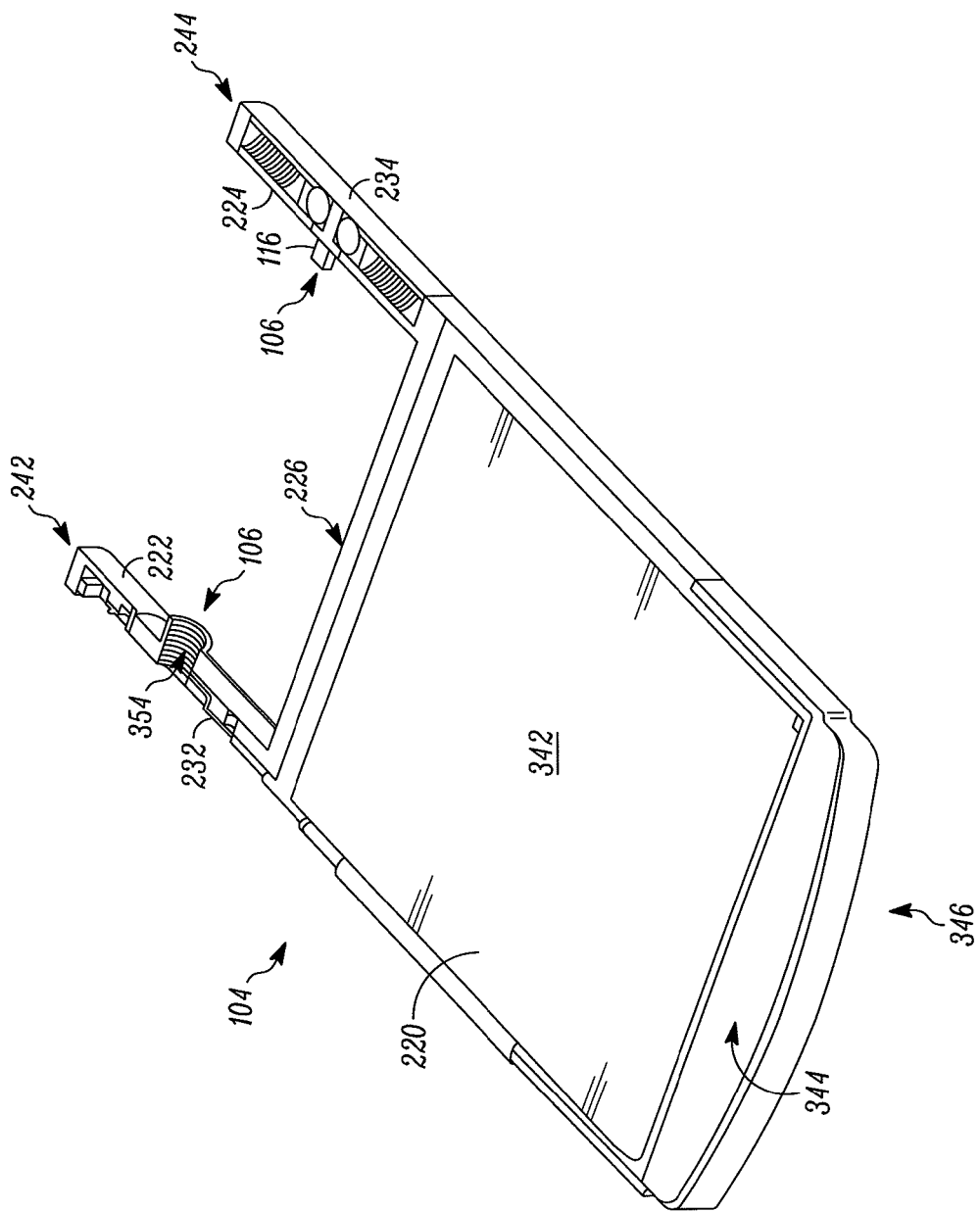
FIG. 5 is a perspective view of a lower housing of the handheld communication device illustrated in FIGS. 1, 2A, and 2B.

As shown in the rear view of the base portion 104 in FIG. 5, the lower housing 104, or base, of the device 100 may house a battery 342 and an antenna 344. The battery 342 has the shape of a plate with a rectangular length and width and a relatively small thickness. The battery 342 and keypad 124 may be substantially coextensive and may each be parallel with the predominant plane 227 of the lower housing 104. The antenna 344 may be located proximate a bottom end 346 of the base 104. In some aspects, positioning the various buttons 134 in the flip portion 102 may lead to users tending to position their hands closer to the flip portion 102 in order to more easily actuate the buttons. In this position, a user's hand will be positioned further away from the antenna 344 located near the bottom end 346 of the lower housing 104, and will absorb less energy from signals emanating from, or being received by, the antenna 344 thereby leading to improved Quality of Service (QoS). According to some aspects, the base 104 may include a transducer (not shown) adapted to provide vibrational feedback to the user.

Note that since the battery 342 is in the base 104 and the populated printed circuit board 348 is in the flip portion 102, the display module 316 may overlie the battery 342 when the device 100 is in the closed configuration. This arrangement allows the thickness of both the flip portion 102 and the base 104 to be minimized, as a result of fewer components being stacked within either housing part. As a result, the overall thickness of the device 100 in the closed configuration may be reduced, making the device 100 more convenient to carry. Also, since the battery 342 does not need to share the lower housing 104 with the circuit board 348, the length and width of the battery 342 may occupy a substantial portion of the base 104. Thus, battery size and capacity may be extended, which may in turn increase the duration of standby time and the amount of communication that can be conducted with the device 100 before battery recharging is necessary.

Figure 8:
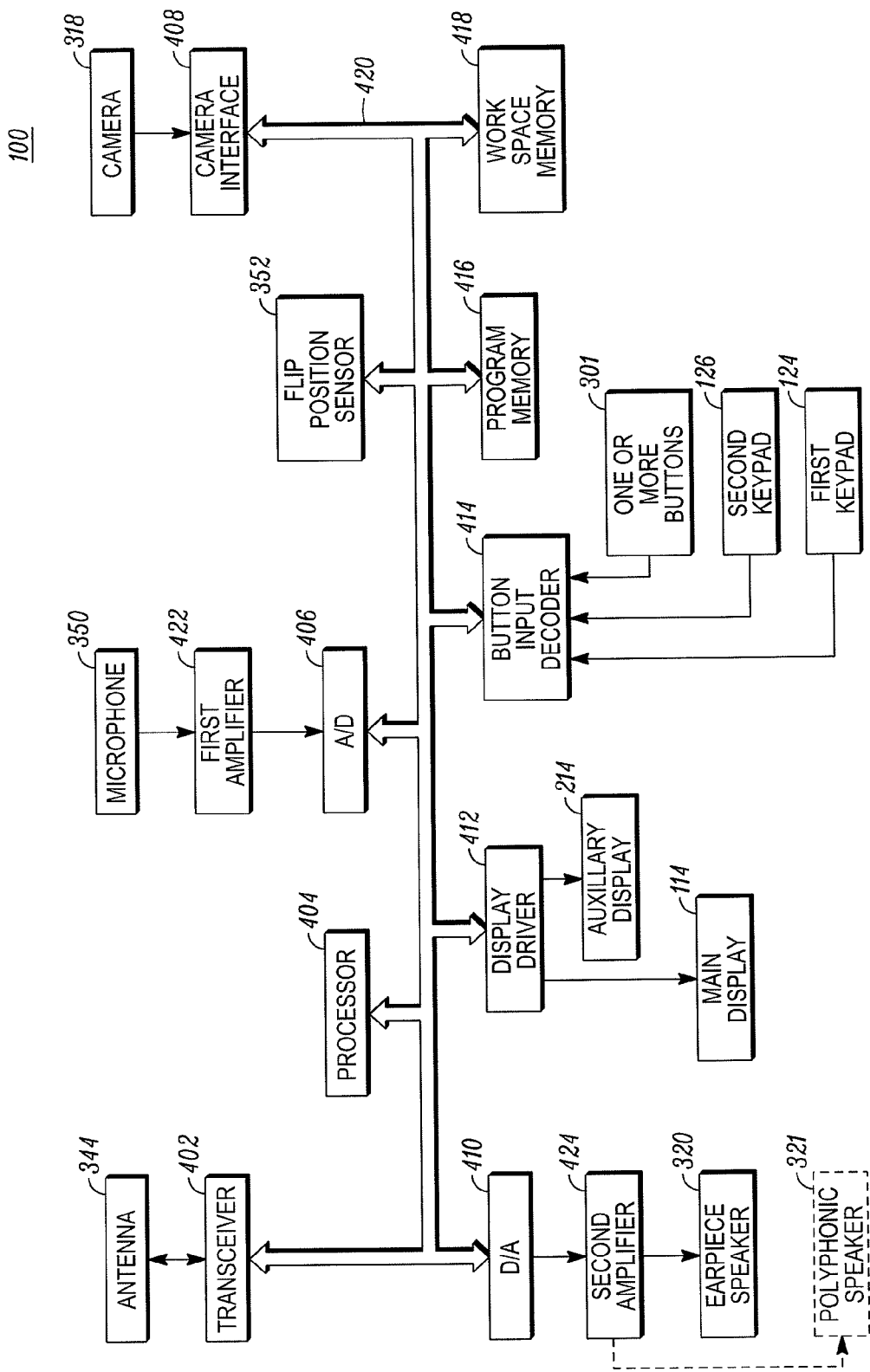
FIG. 8 is a block diagram of the handheld communication device shown in FIGS. 1-6.

It should be appreciated that the inside surface 112 of the base 104 may include a Hall effect sensor 352 (FIG. 8; not shown in FIGS. 1-6). The Hall effect sensor 352 may work in conjunction with a magnet (not shown) associated with the inside surface 110 of the flip portion to sense whether the flip 102 is positioned overlying the base 104, such as a proximately closed position, as shown in FIGS. 2A and 2B, or extended away from the base 104, such as in an opened position, as shown in FIG. 1. A flexible circuit feedthrough 354 connects circuits in the base 104 to circuits in the flip portion 102. In the assembled device 100, the flexible circuit feedthrough 354 passes through the hinge 106. In one embodiment, the hall effect sensor was placed on the PCB edge of the flip edge and the magnet was placed inside the "goal post" formed by the arms 222, 224 in the base.

Referring again to FIG. 5, the base 104 includes a first arm 222 and a second arm 224 extending from a first end 226 of a main housing portion 220 of the base 104. The first and second arms 222, 224 are spaced apart from one another in the width W dimension of the device 100 so as to receive the main or circuit board portion 230 of the flip portion 102 (including the populated printed circuit board(s) 348 and the second keypad 126) between the arms 222, 224. Thus, at least the main portion 230 of the flip portion 102 has a width less that a width of the inside surface 110 of the flip portion, as determined by the outside edges 232, 234 of the arms 222, 224, which corresponds with the width W of the device 100. These arms are referred to as the "goal posts."

The hinge assembly 106 and associated hinge axis 108 are disposed along the arms 222, 224 at a position spaced from the first end 226 of the main housing portion 220 and spaced from free ends 242, 244 of the arms 222, 224. In some aspects, the hinge assembly 106 and hinge axis 108 may be located about halfway between the first end 226 and the free ends 242, 244. This arrangement may be referred to as an "offset" hinge as compared with conventional clamshell-type phones that have a hinge at one end of the phone. As a result, the second keypad 126 may be oriented in substantially the same direction as the first keypad 124 in an open configuration (FIGS. 1 and 6), and the second keypad 126 may be oriented in a direction substantially opposite to the direction of the first keypad 124 in a closed configuration (FIGS. 2A and 2B).

In some aspects, the offset hinge design described above may facilitate one-hand opening of the clamshell-type device. For example, in conventional clamshell phones having a thickness comparable to the device 100 of the present disclosure, it is difficult for a user to insert his/her thumb between the upper and lower housings 102, 104 to open the phone. According to illustrated embodiments of the invention, a user can hold the device 100 in his/her hand and use the index finger to urge an end 231 of the main portion 230 of the flip portion 102 toward the palm of his/her hand. The offset hinge assembly 106 allows the end 231 to rotate about the hinge axis 108 and thereby facilitate one-hand opening of the thin clamshell-type device 100.

Figure 6:
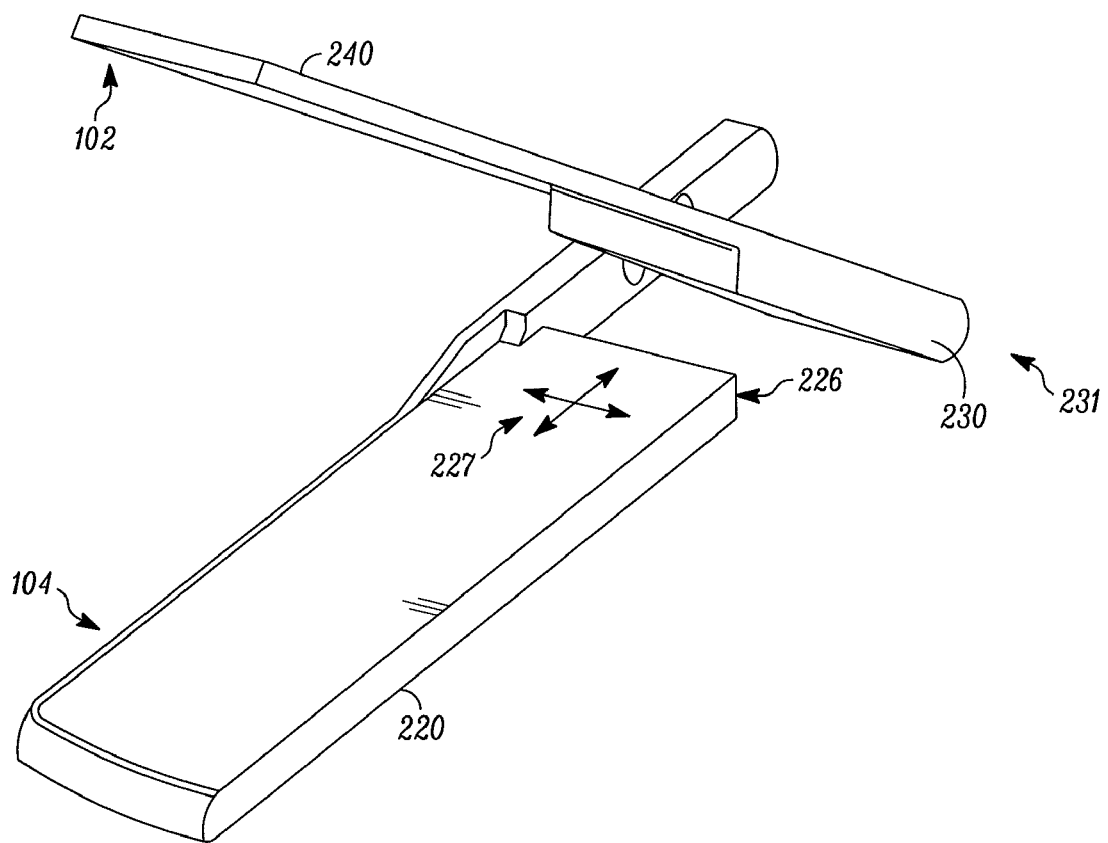
FIG. 6 is a cross-sectional perspective view of the handheld communication device of FIG. 1, shown in a partially open configuration.

Referring to FIGS. 5 and 6, it can be seen that the main portion 230 of the flip portion 102, which contains the main printed circuit board 348 and the second keypad 126 in a stacked configuration, is thicker than the remainder of the flip 102 and is thicker than any portion of the base 104. For example, the main portion 230 of the flip portion 102 has a greater thickness than that of the main housing portion 220 of the base 104. The main portion 230 of the flip 102 also has a thickness greater than that of a display portion 240 of the flip 102. Referring back to FIG. 2A, it can be seen that the combined thicknesses of the display portion 240 of the flip portion 102 and the main housing portion 220 of the base 104 are substantially equal to the thickness of the main portion 230 of the flip 102, which houses the printed circuit board 348.

The ability to package the main printed circuit board 348 in the thicker main portion 230 of the flip portion 102 and to have the axis of rotation through main circuit volume is enabled by the offset hinge assembly 106, which eliminates the need for the main portion 230 to overlie the base 104. Thus, the main printed circuit board 348 is not in a stacked configuration with the battery 342, as with conventional clamshell type devices. In conventional clamshell-type devices, the stacked thickness of a battery and circuit board determine the overall thickness of the device. According to the present disclosure, the device 100 can have an overall thickness in the closed configuration that is substantially equal to the thickness of the main portion 230 of the flip 102 as determined by the combined thickness of the printed circuit board 348 and second keypad 126, which is less than what the combined thickness of the circuit board and battery.

Figure 7:
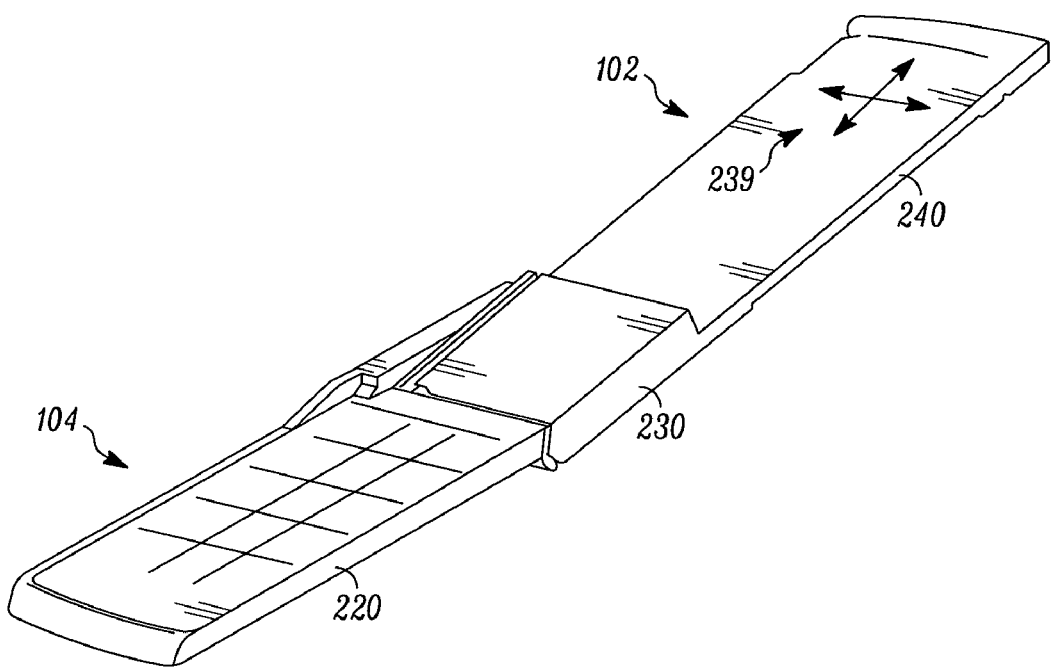
FIG. 7 is a cross-sectional perspective view of the handheld communication device of FIG. 1, shown in the first configuration.

The first end 226 of the main housing portion 220 of the base 104 may serve as a flip-stop as the flip portion 102 is rotated relative to the base 104 into an open configuration. According to some aspects, as shown in FIG. 7, the first end 226 may be configured to stop rotation of the flip portion 102 relative to the base 104 when the angle between the flip 102 and base 104 is about 170°.

Moreover, the thickness of the main portion 230 is a convenient location to locate the user connector interfaces 130. When the communication device 100 is folded flat, the edge 128 is accessible for connection of a USB cable to the connector 132 or removal or insertion of SIM or SD cards.

It may also be noticed from FIG. 2A that a width of the display portion 240 of the flip portion 102 overlying the base 104 in the closed position may be less than the width W dimension of the device 100, as determined by a width of the main housing portion 220 of the base 104. As a result, a user can hold the base 104 of the device 100 when in the closed position without holding the flip 102. Thus, the hand holding the device 100 may not impede opening of the device 100.

According to various aspects, the thickness of device 100 as determined by the thickness of the main portion 230 of the flip 102 and/or the combined thickness of the main housing portion 220 and the display portion 240 may be about 6 mm, for example, 5.9 mm. According to some aspects, the hinge assembly 106 and associated hinge axis 108 may be spaced about 10-12 mm from the first end 208 of the device 100. In various aspects, each of the arms 222, 224 may comprise at least 20-30% of the length of the base 104, which corresponds to about 20-30% of the length L dimension of the device 100. For example, each of the arms 222,224 may comprise about 25% of the length of the base 104, which corresponds to about 25% of the length L dimension of the device 100.

As shown in FIGS. 5 and 6, the arms 222, 224 that extend from the first end 226 of the main housing portion 220 of the base 104 may also extend past the first end 226 so as to overlie a portion of the main housing portion 220. Each of the arms 222, 224 may have a depth D (FIG. 1) at their free ends 242, 244 substantially equal to the depth of the device 100. As the arms 22, 224 extend over the main housing portion 220, their depth may taper until substantially matching the depth of the main housing portion 220. The increased depth of the arms 222, 224 toward their free ends 242, 244 provides more surface area, which may facilitate a secure grasp by a user such as, for example, when holding the device in one hand while attempted to open the device one-handed with that same hand.

FIG. 8 is a block diagram of the handheld communication device 100 shown in FIGS. 1-6. As shown in FIG. 8, the device 100 may comprise a transceiver 402, a processor 404, an analog-to-digital converter (A/D) 406, the flip position sensor 352, a camera interface 408, a digital-to-analog converter (D/A) 410, a display driver 412, a button interface decoder 414, a program memory 416, and a workspace memory 418 coupled together through a system bus 420.

The transceiver 402 may be coupled to the antenna 344. Radio Frequency and/or microwave signals that are modulated with encoded data (e.g., digitized voice audio, text messages, photos, etc.) pass between the transceiver 402 and the antenna 344.

The processor 404 executes control programs, and may also perform communication encoding and decoding tasks. Programs executed by the processor 404 are stored in the program memory 416. The processor 404 uses the workspace memory 418 in executing programs. The processor 404 is suitably part of a highly integrated micro-controller integrated circuit. The micro-controller suitably includes one or more of the other above mentioned components that are coupled together through the signal bus 420. The transceiver 402, the processor 404, and optionally other blocks shown in FIG. 8 are embodied in circuits of the populated printed circuit board 348.

A microphone 350 associated with, for example, the base 104 may be coupled through a first amplifier 422 to the A/D 406. The A/D 406 is used to digitize a user's spoken words, which are then encoded by a voice encoder (vocoder) component of the processor.

A camera 318 may be incorporated as part of the handheld device 100 and may be interfaced to the processor 404 through the camera interface 408. The camera interface 408 reads and digitizes pixel data from the camera 318, and makes such data available to the processor 404 for further processing, e.g., image/video compression encoding.

The button input decoder 414 may be coupled to one or more buttons 301, which may include buttons 134 located in the flip 102 and/or base 104, as well as to the keys of the keypad 124. The button input decoder 414 receives the electrically encoded actuation signals from the first keypad 124, the second keypad 126, and the one or more buttons 301 and identifies each depressed key or button to the processor 404.

The display driver 412 drives the main display 114 and the auxiliary display 214. The D/A 410 drives the earpiece speaker 320 through a second amplifier 424. A similar or the same circuit could also be used to drive a polyphonic speaker 321.

It is noted that, as used in this specification and the appended claims, the singular forms "a," "an," and "the," include plural referents unless expressly and unequivocally limited to one referent. Thus, for example, reference to "a user input" includes two or more different user inputs. As used herein, the term "include" and its grammatical variants are intended to be non-limiting, such that recitation of items in a list is not to the exclusion of other like items that can be substituted or other items that can be added to the listed items.

It will be apparent to those skilled in the art that various modifications and variations can be made in the devices and methods of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A handheld communication device comprising:
  a first housing having a length and width that define a predominant plane of the first housing, a circuit board portion disposed on a first end of the first housing and a display poion disposed on a second end of the first housing, the circuit board portion and display portion both extending parallel to the predominant plane of the first housing;
  a circuit board disposed within the circuit board portion parallel to the predominant plane of the first housing;
  a second housing including a battery and a keypad where the battery and keypad are coextensive along a length and width of a predominant plane of the second housing;
  a hinge assembly that couples a midpoint of the circuit board portion to an end of the second housing where the hinge assembly defines a pivot axis that is mutually parallel to the predominant planes of the both the first and second housings; and
  a user connector interface located on a distal end of the circuit board portion opposite the second portion, where an axis of insertion into the user connector interface is parallel to the predominant plane of the circuit board portion and perpendicular to the pivot axis and where a total thickness of the display portion and second housing is substantially equal to a thickness of the circuit board portion, wherein the user connector interface includes at least one of a subscriber identity module (SIM) connector and a secure digital (SD) memory card connector, wherein the one of the SIM or SD connector is disposed on the printed circuit board set back from the distal end and wherein the distal end further comprises an aperture adapted to receive a SIM or SD card inserted into the SIM or SD connector through the distal end.

2. The handheld communication device as in claim 1 wherein the user connector interface comprises a universal serial bus (USB) connector.

3. The handheld communication device as in claim 1 wherein the user connector interface comprises a subscriber identity module (SIM) connector.

4. The handheld communication device as in claim 1 wherein the user connector interface comprises a secure digital (SD) memory card connector.

5. The handheld communication device as in claim 1 further comprising a lock switch located on a second end of the circuit board portion opposite the display portion.

6. The handheld communication device as in claim 1 further comprising the user connector interface located between a pair of circuit boards within the circuit board portion.

7. A handheld communication device comprising:
  a rectangular base portion housing having a length and width of a greater relative magnitude than a depth of the base portion housing, the length and width defining a predominant plane of the base portion, said rectangular base portion having a pair of mutually parallel aims extending outwards from opposing edges of the base portion along the predominant plane;
  a flip portion housing having a length and width of a greater relative magnitude than a depth of the flip portion housing, the length and width defining a predominant plane of the flip portion housing, the flip portion housing including a circuit board portion including one or more circuit boards proximate a first end of the flip portion housing and a display module extending parallel to the predominant plane proximate a second, opposing end;
  a circuit board disposed within the flip portion parallel to the predominant portion;
  a hinge assembly that couples a midpoint of the mutually parallel arms to a midpoint of the circuit board portion wherein the hinge assembly defines a pivot axis that is parallel to the predominant planes of the base portion housing and flip portion housing;
  a user connector interface located on a distal end of the flip portion housing opposite the base portion where an axis of insertion into the user connector is interface parallel to the predominant plane of the flip portion and perpendicular to the pivot axis,
  wherein the user connector interface includes at least one of a subscriber identity module (SIM) connector and a secure digital (SD) memory card connector, wherein the one of the SIM or SD connector is disposed on the printed circuit board set back from the distal end and wherein the distal end further comprises an aperture adapted to receive a SIM or SD card inserted into the SIM or SD connector through the distal end.

8. The handheld communication device as in claim 7 further comprising a total thickness of the display module portion and base portion is substantially equal to a thickness of the circuit board portion.

9. The handheld communication device as in claim 7 wherein the user connector interface comprises a universal serial bus (USB) connector.

10. The handheld communication device as in claim 7 wherein the user connector interface comprises a subscriber identity module (SIM) connector.

11. The handheld communication device as in claim 7 wherein the user connector interface comprises a secure digital (SD) memory card connector.

12. The handheld communication device as in claim 7 further comprising a lock switch located on a second end of the circuit board portion opposite the display portion.

13. A handheld communication device comprising:
a flip portion having an elongated housing with a display module disposed on a predominant surface of the flip portion at a first end of the elongated housing and a circuit board portion disposed on an opposing, second end;
a base portion having an elongated housing with a keypad disposed on a predominant surface of the elongated housing and with a pair of mutually parallel arms extending from opposing edges of the keypad parallel with the predominant surface;
a circuit board disposed within the flip portion parallel to the predominant surface
a hinge assembly that couples a mid-point of the mutually parallel arms to opposing sides of the elongated flip portion midway along the circuit board portion wherein the hinge assembly defines a pivot axis that extends parallel to the predominant surface of the flip portion and keypad of the base portion; and
a user connector interface located on a distal end of the circuit board portion end of the flip portion housing opposite the base portion where an axis of insertion into the user connector interface is parallel to the predominant surface of the flip portion and perpendicular to a pivot axis of the hinge assembly and wherein when the communication device is in a closed position, the display module is juxtaposed with the keypad and when in an open position, the circuit board portion end of the flip portion is juxtaposed against the base portion between the parallel arms,
wherein the user connector interface includes at least one of a subscriber identity module (SIM) connector and a secure digital (SD) memory card connector, wherein the one of the SIM or SD connector is disposed on the printed circuit board set back from the distal end and wherein the distal end further comprises at least one aperture adapted to receive a SIM or SD card inserted into the SIM or SD connector through the distal end.

14. The handheld communication device as in claim 13 wherein the user connector interface comprises a universal serial bus (USB) connector.

15. The handheld communication device as in claim 13 wherein the user connector interface comprises a subscriber identity module (SIM) connector.

16. The handheld communication device as in claim 13 wherein the user connector interface comprises a secure digital (SD) memory card connector.

17. The handheld communication device as in claim 13 further comprising a lock switch located on a second end of the circuit board portion opposite the display portion.

18. The handheld communication device as in claim 13 further comprising the user connector interface located between a pair of circuit boards within the circuit board portion.

19. The handheld communication device as in claim 18 further comprising a user memory board that engages the user connector interface located between a pair of circuit boards within the circuit board portion.

20. The handheld communication device as in claim 13 further comprising a total thickness of the display portion and second housing is substantially equal to a thickness of the circuit board portion.

* * * * *